(12) United States Patent
Surnilla et al.

(10) Patent No.: US 6,543,431 B2
(45) Date of Patent: Apr. 8, 2003

(54) SYSTEM FOR AIR-FUEL RATIO CONTROL

(75) Inventors: Gopichandra Surnilla, West Bloomfield, MI (US); Salomone Castro, Oak Park, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 95 days.

(21) Appl. No.: 09/682,260

(22) Filed: Aug. 10, 2001

(65) Prior Publication Data

US 2003/0029426 A1 Feb. 13, 2003

(51) Int. Cl.[7] .............................................. F02D 41/04
(52) U.S. Cl. ...................... 123/685; 123/697; 123/179.4
(58) Field of Search ................................ 123/672, 679, 123/685, 179.2, 179.3, 179.4, 697

(56) References Cited

U.S. PATENT DOCUMENTS

| | | | |
|---|---|---|---|
| 4,364,343 A | 12/1982 | Malik | |
| 4,485,772 A | 12/1984 | Uchida et al. | |
| 4,534,326 A | 8/1985 | Bowcott | |
| 4,759,332 A * | 7/1988 | Morozumi | 123/685 |
| 5,036,820 A * | 8/1991 | Fujimoto et al. | 123/686 |
| 5,497,655 A | 3/1996 | Gee et al. | |
| 6,153,071 A | 11/2000 | Omara et al. | |
| 6,481,428 B1 * | 11/2002 | Makki et al. | 123/685 |

* cited by examiner

Primary Examiner—Tony M. Argenbright
Assistant Examiner—Arnold Castro
(74) Attorney, Agent, or Firm—Julia Voutyras; Allan J. Lippa

(57) ABSTRACT

A system and a method of controlling an engine during and after a temporary fueling shut-off during idling, deceleration or a switch to auxiliary power generating device is presented. According to this method, maintaining power to the heater of an exhaust gas sensor during the temporary shut-off, and thus keeping the sensor operational shortly following resumption of fueling can eliminate a delay in closed loop air-fuel ratio control. This method provides improvements to fuel economy and emission control.

25 Claims, 3 Drawing Sheets

SYSTEM FOR AIR-FUEL RATIO CONTROL

BACKGROUND OF INVENTION

The present invention relates to electronic engine controls for an internal combustion engine, and in particular to closed loop air-fuel ratio control.

Internal combustion engines are typically coupled to an emission control device known as a three-way catalytic converter (TWC) designed to reduce combustion by-products such as carbon monoxide (CO), hydrocarbon (HC), and oxides of nitrogen (NOx). Additionally, an exhaust gas sensor capable of providing a signal representative of an air-fuel ratio of an exhaust gas mixture exiting the TWC can be used in a closed-loop strategy to control the engine air-fuel ratio, providing fuel economy and emission control improvements over an open-loop strategy. Such sensors typically need to be heated above a predetermined temperature in order to operate properly. Therefore, in order to make measurements of the air-fuel ratio even when the exhaust gas temperature is low, some sensors are equipped with heaters which start heating up when the ignition key is in the "ON" position.

The inventors herein have recognized a disadvantage with this approach. Namely, when the engine is first started, there is a certain delay before closed-loop air-fuel control strategy can commence associated with the time that it takes for the exhaust gas sensor to heat up. This delay reduces fuel economy and emission control. However, the inventors have recognized that under certain operating conditions, such as when the engine is temporarily shut off during idling, or decelerating, maintaining the power to the heaters can eliminate this delay in closed-loop control. Therefore, when the engine is restarted, the sensor temperature will be at the level required for proper operation.

SUMMARY OF INVENTION

This invention recognizes that the delay in the start of closed loop air-fuel control strategy can be reduced by maintaining the power to the exhaust gas sensor heaters during the time periods when the engine is temporarily shut off but the ignition key remains in the "ON" position.

Accordingly, a system and a method of controlling an internal combustion engine coupled to an exhaust gas aftertreatment device, the device having a sensor coupled downstream of it, include: starting the engine; performing closed loop air-fuel ratio control after a first set of operating conditions has been met; stopping the engine; subsequently restarting the engine; and performing closed loop air-fuel ratio control after a second set of operating conditions different from said first set of operating conditions has been met.

According to another embodiment of the present invention, a system and a method for controlling an engine in a vehicle, the engine having an exhaust gas aftertreatment device coupled downstream of it, include: a sensor, comprising a heater, providing a signal indicative of an air-fuel ratio of an exhaust gas mixture entering the device; and a controller supplying power to said heater, providing a first indication that a first set of operating conditions has been met, and in response to said first indication adjusting an amount of fuel into the engine based on said sensor signal, discontinuing supply of fuel to the engine, maintaining power to said heater, resuming supply of fuel to the engine, providing a second indication that a second set of operating conditions different from said first set of operating conditions has been met, and in response to said second indication adjusting said amount of fuel of fuel into the engine based on said sensor signal.

An advantage of this invention is improved fuel economy. Another advantage of the present invention is improved emission control.

The above advantages and other advantages, objects and features of the present invention will be readily apparent from the following detailed description of the preferred embodiments when taken in connection with the accompanying drawings.

BRIEF DESCRIPTION OF DRAWINGS

The objects and advantages described herein will be more fully understood by reading an example of an embodiment in which the invention is used to advantage, referred to herein as the Description of Preferred Embodiment, with reference to the drawings, wherein.

DETAILED DESCRIPTION

As will be appreciated by those of ordinary skill in the art, the present invention is independent of the particular underlying engine technology and configuration. As such, the present invention may be used in a variety of types of internal combustion engines, such as conventional engines, in addition to direct injection stratified charge (DISC) or direct injection spark ignition engines (DISI).

Figure 1:
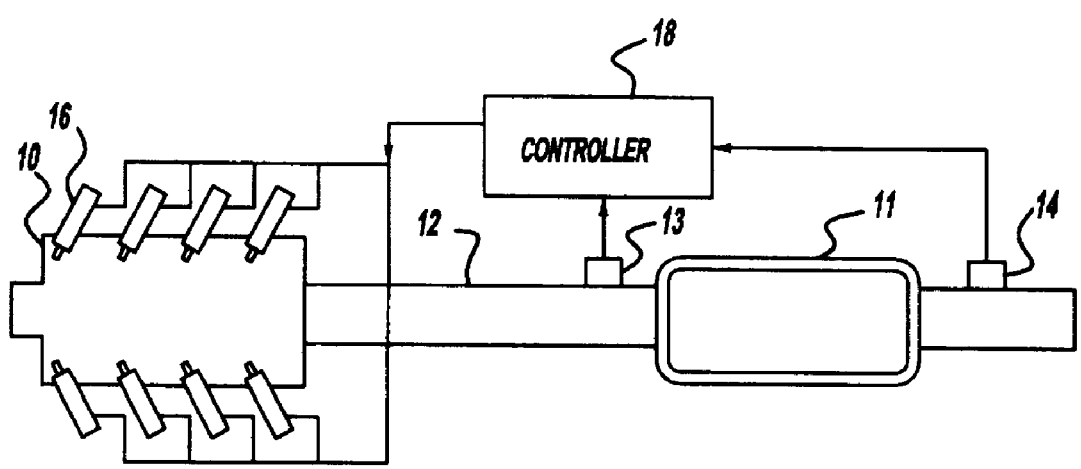
FIG. 1 is a block diagram of an engine and control system in accordance with an embodiment of this invention.

A block diagram illustrating an engine control system for a representative internal combustion engine according to one embodiment of the present invention is shown in FIG. 1. Preferably, engine 10 has an exhaust gas path 12 coupled to a catalytic converter 11. Exhaust gas sensor 13, including a heater, is shown coupled upstream of catalytic converter 11, and may comprise any one of a plurality of conventional exhaust gas sensors. In this example, sensor 13 comprises a heated exhaust gas oxygen (HEGO) sensor that generates a two-state signal responsive to the oxygen level in the exhaust gases from the engine. In either case, sensor 13 generates a signal having a first state when the oxygen level in the exhaust gases is above a predetermined oxygen level (indicative of a desired air-fuel ratio), indicating a lean air-fuel ratio. Sensor 13 generates the signal having a second state when the oxygen level in the exhaust gases is below the predetermined oxygen level, indicating a rich air-fuel ratio. In an alternate embodiment, the sensor 13 may comprise a universal exhaust gas oxygen (UEGO) sensor, also known as a proportional oxygen sensor. The UEGO sensor generates a signal whose magnitude is proportional to the oxygen level (and the air-fuel ratio) in the exhaust gases. In another alternate embodiment, the sensor 13 may comprise one of a carbon monoxide (CO) sensor, and a hydrocarbon (HC) sensor that generates a signal whose magnitude is related to the level of CO, HC, respectively, in the exhaust gases. Those skilled in the art will recognize that any of the above exhaust gas sensors may be viewed as an air-fuel ratio sensor that generates a signal whose magnitude is indicative of the air-fuel ratio measured in exhaust gases. Advantageously, this signal is used during feedback air-fuel ratio control to maintain average air-fuel ratio at a desired air-fuel ratio as described later herein. In an alternative embodiment, sensor 13 can provide signal EGO, exhaust gas oxygen (not shown), which indicates whether exhaust air-fuel ratio is lean or rich of stoichiometry. The signal generated by sensor 13 is applied to controller 18 which produces an output applied to fuel injector 16, which controls fuel injection into engine 10.

Additionally, another air-fuel ratio sensor 14 could be coupled downstream of the catalytic converter 11, and it's output could also be used by controller 18 in controlling fuel injection.

Controller 18 is shown in FIG. 1 as a conventional microcomputer including but not limited to: microprocessor unit, input/output ports, an electronic storage medium for executable programs and calibration values, random access memory, keep alive memory, and a conventional data bus.

The diagram in FIG. 2 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Figure 2A:
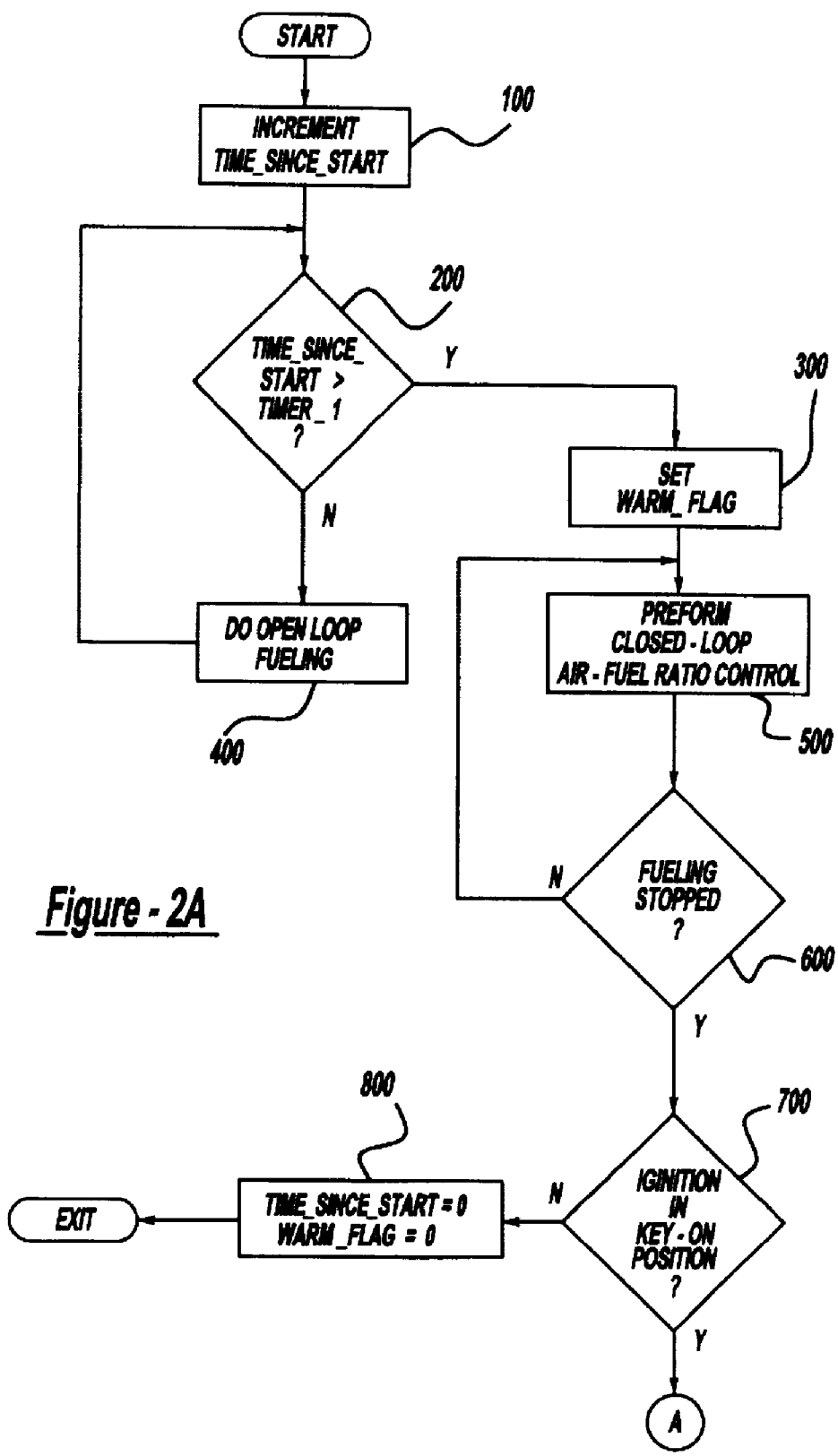
FIGS. 2A and 2B are logic flowcharts for controlling the engine in accordance with an embodiment of this invention.
Figure 2B:
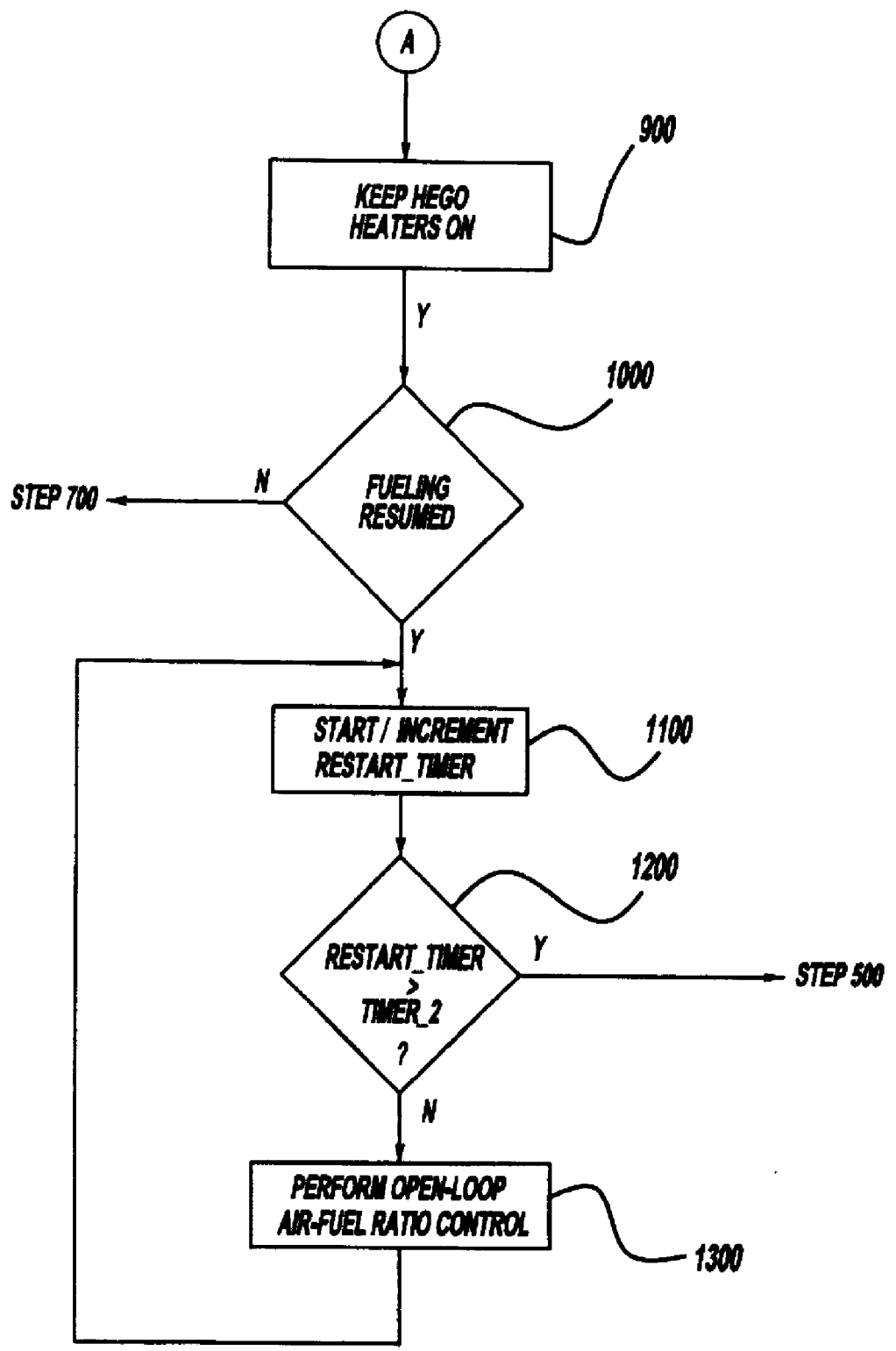

Referring now to FIG. 2A, first, in step 100, a variable Time__since__Start indicative of the time elapsed since the engine was first turned on is incremented. Next, in decision block 200, a determination is made whether the timer is greater than a TIMER__1, which is a calibratable constant indicative of the time it takes for the sensor to heat up to proper operating temperature, and in this particular example is set at about 40 seconds. If the answer to step 200 is NO, the routine proceeds to step 400, wherein open loop air-fuel ratio control commences and the routine cycled back to step 200. The routine will perform open-loop fuel control, i.e., not utilize the output of the sensor 13, until sufficient time has elapsed for the sensor to heat up to proper operating temperature. If the answer to step 200 is YES, i.e., sufficient time has elapsed, a WARM__FLAG is set to 1 in step 300 indicating that sensor 13 has reached proper operating temperature. Alternatively, instead of using the timer, the temperature of the sensor can be inferred from operating conditions, such as catalyst temperature, exhaust gas temperature, engine RPM, etc. Closed-loop control will commence when the inferred sensor temperature has exceeded a predetermined value. The routine then proceeds to step 500 wherein closed-loop air-fuel ratio control commences, i.e., the output of the sensor 13 is used in controlling fueling to the engine. The routine proceeds to step 600 wherein a determination is made whether fueling to the engine has stopped. If the answer to step 600 is NO, the routine returns to step 500 and closed-loop operation continues. If the answer to step 600 is YES, logic proceeds to step 700 wherein a determination is made whether the ignition is in the KEY__ON position. If the answer to step 700 is NO, Time__since__Start is reset to zero, and WARM__FLAG is set to zero in step 800, and the routine exits. If the answer to step 700 is YES, fueling to the engine has stopped but the ignition is in the KEY__ON position. This condition could be achieved, when, for example, fueling to the engine is temporarily shut-off during idling or decelerating for fuel economy savings or improved emission control. Alternatively, fueling could be discontinued while the ignition is in the KEY__ON position in vehicles that have power sources in addition to conventional internal combustion engines, such as hybrid electric vehicles, or vehicles with additional hydraulic motors. If the answer to step 700 is YES, the routine proceeds to FIG. 2B step 900 wherein the power to the sensor 13 heater is kept on, i.e., the sensor remains heated and ready to operate. The routine then proceeds to decision block 1000 wherein a determination is made whether fueling to the engine has resumed. If the answer to step 1000 is NO, the routine cycles back to FIG. 2A step 700. If the answer to step 1000 is YES, i.e., fueling has resumed, a Restart__Timer is started and incremented in step 1100. The routine then proceeds to step 1200 wherein a decision is made whether Restart__Timer is greater than TIMER__2, which is a calibratable timer constant, indicative of the delay required for the exhaust gas to stabilize before closed-loop air-fuel ratio control commences, and in this example is set at approximately two seconds. If the answer to step 1200 is NO, the routine proceeds to step 1300 wherein open loop fuel strategy commences, and then cycles back to step 1100. When the answer to step 1200 becomes YES, i.e., the sufficient time for the exhaust gas to stabilize has elapsed, the routine returns to step 500 wherein closed loop air-fuel ratio control resumes.

Therefore, according to one embodiment of the present invention, it is possible to reduce the delay in the resumption of the closed loop air-fuel ratio control due to temporary fuel shut offs at idle or deceleration, or due to a switch to an auxiliary power sources such as an electric motor or hydraulic motor. If the power to the sensor heaters is kept on under these conditions, the sensor will be ready to operate as soon as fueling resumes. However, a short timed delay is introduced before closed loop strategy resumes in order to allow the exhaust gas to stabilize.

This concludes the description of the invention. The reading of it by those skilled in the art would bring to mind many alterations and modifications without departing from the spirit and the scope of the invention. Accordingly, it is intended that the scope of the invention is defined by the following claims:

What is claimed is:

1. A method of controlling an internal combustion engine having a sensor disposed in an exhaust manifold connecting the engine and an exhaust gas aftertreatment device, the method comprising:

starting the engine;

performing closed loop air-fuel ratio control after a first set of operating conditions has been met;

stopping the engine;

subsequently restarting the engine; and performing closed loop air-fuel ratio control after a second set of operating conditions different from said first set of operating conditions has been met.

2. The method cited in claim 1 wherein said first set of operating conditions comprises a first predetermined time delay.

3. The method cited in claim 2 wherein said second set of operating conditions comprises a second predetermined time delay shorter than said first predetermined time delay.

4. The method cited in claim 3 wherein said second set of operating conditions further comprises an estimated temperature of an exhaust gas mixture entering the device.

5. The method cited in claim 2 wherein the sensor is an exhaust gas sensor.

6. The method cited in claim 5 wherein said exhaust gas sensor is an oxygen sensor.

7. The method cited in claim 5 wherein said exhaust gas sensor is a carbon monoxide sensor.

8. The method cited in claim 5 wherein said exhaust gas sensor is a hydrocarbon sensor.

9. The method cited in claim 2 wherein said second set of operating conditions comprises an exhaust gas aftertreatment device temperature.

10. The method cited in claim 1 wherein the exhaust gas aftertreatment device is a three-way catalyst.

11. The method cited in claim 1 wherein the engine is further coupled to another power generating device.

12. The method cited in claim 11 wherein said power generating device is an electric motor.

13. The method cited in claim 11 wherein said power generating device is a hydraulic motor.

14. A system for controlling an engine in a vehicle, the engine having an exhaust gas aftertreatment device coupled downstream of it, the system comprising:
   a sensor, comprising a heater, providing a signal indicative of an air-fuel ratio of an exhaust gas mixture entering the device;
   a controller supplying power to said heater, providing a first indication that a first set of operating conditions has been met, and in response to said first indication adjusting an amount of fuel into the engine based on said sensor signal, discontinuing supply of fuel to the engine, maintaining power to said heater, resuming supply of fuel to the engine, providing a second indication that a second set of operating conditions different from said first set of operating conditions has been met, and in response to said second indication adjusting said amount of fuel of fuel into the engine based on said sensor signal.

15. The system cited in claim 14 wherein the engine is an internal combustion engine.

16. The system cited in claim 15 wherein said internal combustion engine is further coupled to an auxiliary power source.

17. The system cited in claim 16 wherein said auxiliary power source is an electric motor.

18. The system cited in claim 16 wherein said auxiliary power source is a hydraulic motor.

19. The system cited in claim 14 wherein the exhaust gas aftertreatment device is a three-way catalyst.

20. The system cited in claim 14 wherein said sensor is an oxygen sensor.

21. The system cited in claim 14 wherein said sensor is a carbon monoxide sensor.

22. The system cited in claim 14 wherein said sensor is a hydrocarbon sensor.

23. The system cited in claim 14 wherein said first set of operating conditions comprised comprises a first time delay.

24. The system cited in claim 23 wherein said second set of operating conditions comprises a second time delay shorter than said first time delay.

25. The system cited in claim 23 wherein said second set of operating conditions comprises an exhaust gas aftertreatment device temperature.

* * * * *